United States Patent
Brzezinski et al.

(10) Patent No.: US 11,033,087 B2
(45) Date of Patent: *Jun. 15, 2021

(54) INDUCTIVELY CHARGEABLE EARBUD CASE

(71) Applicant: Apple Inc., Cupertino, CA (US)

(72) Inventors: Makiko K. Brzezinski, Santa Clara, CA (US); Christopher J. Walton, Sunnyvale, CA (US); Christopher S. Graham, San Francisco, CA (US); Daniel C. Wagman, Scotts Valley, CA (US); Eric S. Jol, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/827,517

(22) Filed: Mar. 23, 2020

(65) Prior Publication Data

US 2020/0221843 A1 Jul. 16, 2020

Related U.S. Application Data

(63) Continuation of application No. 16/512,261, filed on Jul. 15, 2019, now Pat. No. 10,631,609, which is a
(Continued)

(51) Int. Cl.
*H02J 7/04* (2006.01)
*H04R 1/10* (2006.01)
(Continued)

(52) U.S. Cl.
CPC ............. *A45C 13/02* (2013.01); *A45C 11/24* (2013.01); *H02J 7/0013* (2013.01);
(Continued)

(58) Field of Classification Search
CPC ...... H04B 1/385; H04B 1/3888; H04B 5/003; H04R 1/1016; H04R 1/1025;
(Continued)

(56) References Cited

U.S. PATENT DOCUMENTS 8,180,093 B2 5/2012 Hankey et al.
8,185,084 B2 5/2012 Terlizzi
(Continued)

OTHER PUBLICATIONS

Non-Final Office Action issued in U.S. Appl. No. 15/697,315, dated Jul. 3, 2018 in 10 pages (of-record in parent application).
(Continued)

*Primary Examiner* — Philip Sobutka
(74) *Attorney, Agent, or Firm* — Kilpatrick Townsend & Stockton LLP

(57) ABSTRACT

A case a portable listening device. The case includes a housing having an interior space to receive the portable listening device; a lid attached to the housing; a rechargeable battery and first and second wireless power receiving elements configured to receive electric charge from a wireless power transmitter during a charging event. The case further includes switching circuitry that is configured to disable one of the first or second wireless power receiving elements during a charging event when the disabled element is receiving power less efficiently than the other element.

20 Claims, 10 Drawing Sheets

Related U.S. Application Data continuation of application No. 16/228,573, filed on Dec. 20, 2018, now Pat. No. 10,390,594, which is a continuation of application No. 15/697,315, filed on Sep. 6, 2017, now Pat. No. 10,206,474.

(60) Provisional application No. 62/384,105, filed on Sep. 6, 2016.

(51) Int. Cl.
| | |
|---|---|
| *A45C 13/02* | (2006.01) |
| *A45C 11/24* | (2006.01) |
| *H02J 50/40* | (2016.01) |
| *H02J 50/10* | (2016.01) |
| *H02J 7/00* | (2006.01) |
| *H02J 7/02* | (2016.01) |

(52) U.S. Cl.
CPC ............ *H02J 7/0044* (2013.01); *H02J 7/025* (2013.01); *H02J 50/10* (2016.02); *H02J 50/40* (2016.02); *H04R 1/1025* (2013.01); *A45C 2013/025* (2013.01); *H04R 1/1016* (2013.01)

(58) Field of Classification Search
CPC ....... H04R 2420/07; H04R 1/02; H02J 7/025; H02J 7/0044; H02J 2007/0096; H02J 50/40; H02J 7/0042
USPC .......................................................... 455/573
See application file for complete search history.

(56) References Cited

U.S. PATENT DOCUMENTS

| | | | |
|---|---|---|---|
| 8,311,255 B2 | 11/2012 | Hankey et al. | |
| 8,401,219 B2 | 3/2013 | Hankey et al. | |
| 8,712,071 B2 | 4/2014 | Terlizzi et al. | |
| 8,867,758 B2 | 10/2014 | Terlizzi et al. | |
| 9,118,990 B2 | 8/2015 | Hankey et al. | |
| 9,287,657 B2 | 3/2016 | Hankey et al. | |
| 9,294,830 B2 | 3/2016 | Terlizzi | |
| 9,769,558 B2 | 9/2017 | Chandramohan et al. | |
| 9,854,343 B2 | 12/2017 | Hankey et al. | |
| 9,961,431 B2 | 5/2018 | McPeak et al. | |
| 9,961,433 B2 | 5/2018 | Chawan et al. | |
| 9,967,644 B2 | 5/2018 | Chawan et al. | |
| 9,967,646 B2 | 5/2018 | Hankey et al. | |
| 9,967,648 B2 | 5/2018 | Panecki et al. | |
| 9,967,649 B2 | 5/2018 | Chandramohan et al. | |
| 9,967,650 B2 | 5/2018 | Chawan et al. | |
| 9,973,840 B2 | 5/2018 | Wagman et al. | |
| 9,973,845 B2 | 5/2018 | Chawan et al. | |
| 10,003,880 B2 | 6/2018 | Wagman et al. | |
| 10,003,881 B2 | 6/2018 | Cousins et al. | |
| 10,009,678 B2 | 6/2018 | Panecki et al. | |
| 10,097,913 B2 | 10/2018 | Zörkendörfer et al. | |
| 10,165,346 B2 | 12/2018 | Hankey et al. | |
| 10,182,282 B2 | 1/2019 | McPeak et al. | |
| 10,206,474 B2 * | 2/2019 | Brzezinski | H02J 7/0044 |
| 10,212,506 B2 | 2/2019 | Panecki et al. | |
| 10,225,637 B2 | 3/2019 | Panecki et al. | |
| 10,313,775 B2 | 6/2019 | Hankey et al. | |
| 10,390,594 B2 * | 8/2019 | Brzezinski | A45C 13/02 |
| 10,397,682 B2 | 8/2019 | Chawan et al. | |
| 10,397,683 B2 | 8/2019 | LeBlanc et al. | |
| 10,433,043 B2 | 10/2019 | Hankey et al. | |
| 10,516,931 B2 | 12/2019 | Hankey et al. | |
| 10,631,609 B2 * | 4/2020 | Brzezinski | H02J 7/025 |
| 2011/0018360 A1 | 1/2011 | Baarman et al. | |
| 2015/0245127 A1 | 8/2015 | Shaffer | |
| 2017/0093454 A1 | 3/2017 | Chawan et al. | |
| 2018/0064224 A1 | 3/2018 | Brzezinski et al. | |
| 2019/0289381 A1 | 9/2019 | Chawan et al. | |
| 2019/0289382 A1 | 9/2019 | Chawan et al. | |
| 2019/0289383 A1 | 9/2019 | Chawan et al. | |
| 2020/0084533 A1 | 3/2020 | Hankey et al. | |

OTHER PUBLICATIONS

Notice of Allowability issued in U.S. Appl. No. 15/697,315, dated Dec. 12, 2018 in 4 pages (of-record in parent application).
Notice of Allowance issued in U.S. Appl. No. 15/697,315, dated Nov. 6, 2018 in 5 pages (of-record in parent application).
Non-Final Office Action issued in U.S. Appl. No. 16/228,573, dated Feb. 25, 2019 in 10 pages (of-record in parent application).
Notice of Allowance issued in U.S. Appl. No. 16/228,573, dated Jun. 12, 2019 in 5 pages (of-record in parent application).
Non-Final Office Action issued in U.S. Appl. No. 16/512,261, dated Sep. 4, 2019 in 10 pages (of-record in parent application).
Notice of Allowance issued in U.S. Appl. No. 16/512,261, dated Dec. 31, 2019 in 5 pages (of-record in parent application).

* cited by examiner

FIG. 8A  FIG. 8B

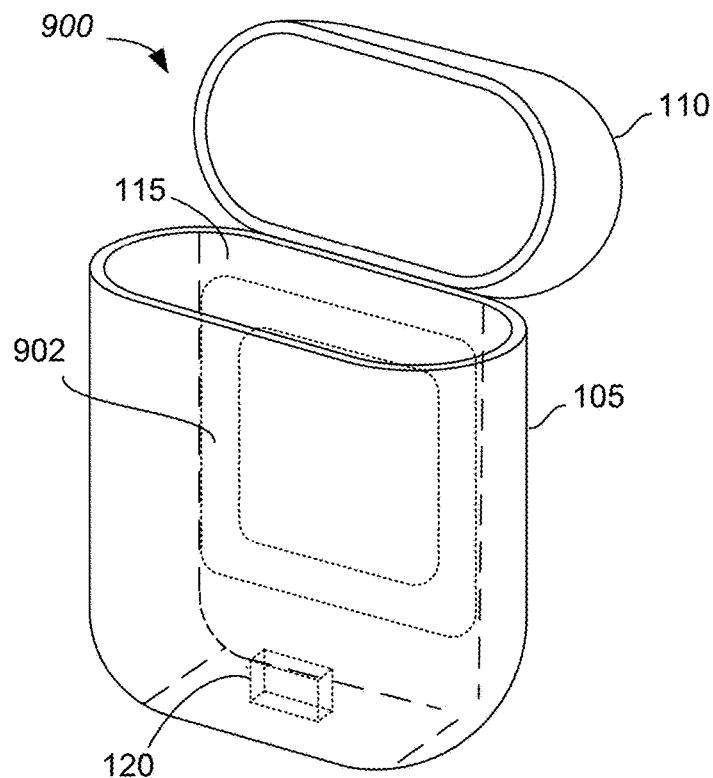
FIG. 9A
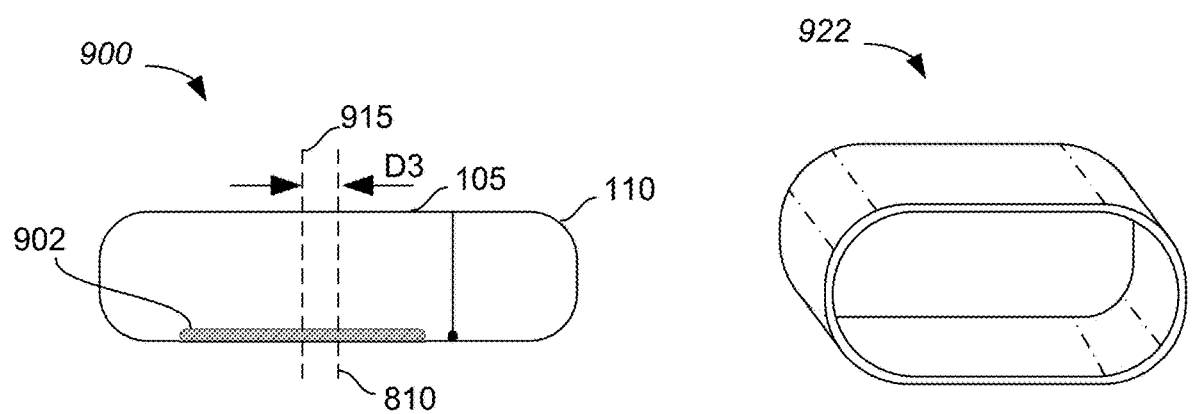
FIG. 9B  FIG. 9C

INDUCTIVELY CHARGEABLE EARBUD CASE

CROSS-REFERENCES TO RELATED APPLICATIONS

This application is a Continuation of U.S. patent application Ser. No. 16/512,261, entitled "INDUCTIVELY CHARGEABLE EARBUD CASE" filed Jul. 15, 2019, which is a Continuation of U.S. patent application Ser. No. 16/228,573, entitled "INDUCTIVELY CHARGEABLE EARBUD CASE" filed Dec. 20, 2018, which is a Continuation of U.S. patent application Ser. No. 15/697,315, entitled "INDUCTIVELY CHARGEABLE EARBUD CASE" filed Sep. 6, 2017, now U.S. Pat. No. 10,206,474 issued on Feb. 19, 2019, which claims benefit to U.S. Provisional Application No. 62/384,105, entitled "DUAL SOLENOID INDUCTIVE CHARGING FOR EARBUD CASE" which was filed Sep. 6, 2016. Each of the Ser. No. 16/228,573; 15/697,315; and 62/384,105 applications are hereby incorporated by reference in its entirety for all purposes.

BACKGROUND

Electronic devices (e.g., mobile phones, media players, electronic watches, and the like) operate when there is charge stored in their batteries. Batteries can be charged by coupling the electronic device to a power source through a physical connection, such as through a charging cord. Using charging cords to charge batteries in electronic devices, however, requires the electronic device to be physically tethered to a power outlet. Additionally, using charging cords requires the mobile device to have a receptacle configured to mate with the charging cord. The receptacle is typically a cavity in the electronic device that provides avenues within which dust and moisture can intrude and damage the device. Furthermore, a user of the electronic device has to physically connect the charging cable to the receptacle in order to charge the battery.

To avoid such shortcomings, wireless charging devices have been developed to charge electronic devices without the need for a charging cord. Electronic devices may charge by merely resting on a charging surface of the charging device. Magnetic fields generated by transmitters disposed below the charging surface may induce corresponding currents in receivers that have a corresponding inductive coil. The induced currents may be used by the electronic device to charge its internal battery.

Some conventional wireless charging applications rely upon precise alignment of transmission and receiving coils to achieve efficient wireless charging. In such devices, the efficiency of inductive charging typically drops rapidly with any misalignment of the transmission and receiving coils. This may limit the number of ways in which a charger for an electronic device can be designed and/or provide a less than ideal user experience for inductive charging.

SUMMARY

Embodiments of the disclosure pertain to portable electronic devices that can be wirelessly charged on a charging surface, such as an inductive charging mat or pad that provides power at different locations along the charging surface. An electronic device according to the disclosure can generally receive charge when positioned anywhere within the charging surface. While embodiments of the disclosure can include many different types of portable electronic devices, some embodiments pertain to a case for a portable listening device, such as a pair of headphones or a pair of wireless earbuds. The case can include one or more cavities to hold the listening device and charging circuitry to provide power to a rechargeable battery within the listening device (or within each of the pair of earbuds).

According to some embodiments an electronic device can include first and second wireless power receiving coils (e.g., solenoid coils) that can wirelessly receive power from one or more wireless power transmit coils within the charging mat. The first and second coils can each receive wireless power at varying degrees of efficiency from the transmit coils depending on the location of each of the first and second wireless power receiving coils vis-à-vis the wireless power transmitting coils. Generally, one of the first and second receiving coils will receive power at a higher efficiency than the other. The electronic device can include switching circuitry that can identify and disable the wireless receiving coil that receives power at the lower efficiency in order to receive a higher overall charging efficiency for the electronic device than if both wireless receiving coils receive power.

In some embodiments a case for a portable listening device is provided. The case can include a housing having an interior space to receive the portable listening device; a lid attached to the housing and operable between a closed position where the lid is aligned over the interior space and an open position where interior space is exposed enabling the portable listening device to be removed from the interior space; a first wireless power receiving element positioned within the housing at a first location, the first wireless power receiving element configured to receive electric charge from a wireless power transmitter during a charging event in which the case is positioned proximate to the wireless power transmitter; a second wireless power receiving element positioned within the housing at a second location, different than the first location, the second wireless power receiving element configured to receive electric charge from the wireless power transmitter during the charging event; a charging system operatively coupled receive power from the first and second wireless power receiving elements and transfer the received power to a rechargeable battery; and switching circuitry coupled to the charging system and configured to, during the charging event, disable one of the first or second wireless power receiving elements if the disabled element is receiving power less efficiently than the other element.

In various examples a portable listening device case can also include one or more of the following: the switching circuitry can include passive analog circuitry that automatically deactivates the wireless power receiving element receiving power at a lower efficiency, each of the first and second wireless power receiving elements can be a solenoid coil, and/or the case can be a case for a pair of earbuds and the housing includes first and second cavities to receive the pair of earbuds.

In some embodiments a case for a pair of earbud is provided. The case can include: a housing having first and second opposing major surfaces, first and second opposing sidewalls extending between the first and second major surfaces, a bottom surface extending between the first and second major surfaces and between the first and second sidewalls, and first and second cavities formed within the housing, the first cavity configured to receive a first earbud in the pair of earbuds and the second cavity configured to receive a second earbud in the pair of earbuds; a lid attached to the second major surface of the housing and operable between a closed position where the lid is aligned over the first and second cavities and an open position where the first and second cavities are exposed enabling the pair of earbuds to be removed from or placed within the case; a connector having a connector cavity with an opening at the bottom surface of the case and a plurality of contacts positioned within the open; a first wireless power receiving coil positioned within the housing between the opening and the first sidewall, the first wireless power receiving element configured to receive electric charge from a wireless power transmitter during a charging event in which the case is positioned proximate to the wireless power transmitter; a second wireless power receiving coil positioned within the housing between the opening and the second sidewall, the second wireless power receiving element configured to receive electric charge from the wireless power transmitter during the charging event; and a charging system operatively coupled receive power from the first and second wireless power receiving elements and transfer the received power to a rechargeable battery.

In other embodiments a case for a portable listening device can include: a housing having an interior space to receive the portable listening device, the housing having first and second major opposing surfaces that define an exterior surface of the case; a processor disposed within the housing; a magnet disposed within the housing; a lid attached to the housing by a hinge and operable between a closed position where the lid is aligned over the interior space and an open position where interior space is exposed enabling the portable listening device to be removed from the interior space; a wireless power receiving module comprising: (i) a wireless power receiving element positioned within the housing adjacent to the first major surface, the first wireless power receiving element configured to receive electric charge from a wireless power transmitter during a charging event in which the case is positioned proximate to the wireless power transmitter, and (ii) a ferrite plate disposed between the wireless power receiving element and the processor, the ferrite plate having a surface area that covers the wireless power receiving element except at a location adjacent to the magnet; and a charging system operatively coupled receive power from the wireless power receiving element and transfer the received power to a rechargeable battery.

In various examples the case can also include one or more of the following: the wireless power receiving module comprises a stranded coil, the wireless power receiving module comprises a coil formed on a flex circuit, first and second magnets positioned on opposite sides of the housing adjacent to the hinge and the ferrite plate covers the wireless power receiving element except at a first location adjacent to the first magnet and a second location adjacent to the second magnet. Also in addition to first and second magnets as described, in some embodiments the case can further include third and fourth magnets positioned on opposite sides of the lid adjacent to the hinge and adjacent to the first and second magnets, respectively, when the lid is in the closed position. The magnets can be arranged such that the first magnet repels the third magnet and the second magnet repels the fourth magnet when the lid is in the closed position, and the first magnet attracts the third magnet and the second magnet attracts the fourth magnet when the lid is in the closed position.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

FIG. 8A is a simplified side plan view of case 100 shown in FIG. 1 according to some embodiments of the disclosure;

FIG. 8B is a simplified side plan view of case 200 shown in FIG. 2 according to some embodiments of the disclosure;

FIG. 9A depicts a simplified perspective view of an earbud case according to additional embodiments of the disclosure;

FIG. 9B is a simplified side plan view of case 900 shown in FIG. 9A according to some embodiments of the disclosure;

FIG. 9C is a simplified illustration of a wireless power receiving element according to some embodiments of the disclosure;

DETAILED DESCRIPTION

Figure 1:
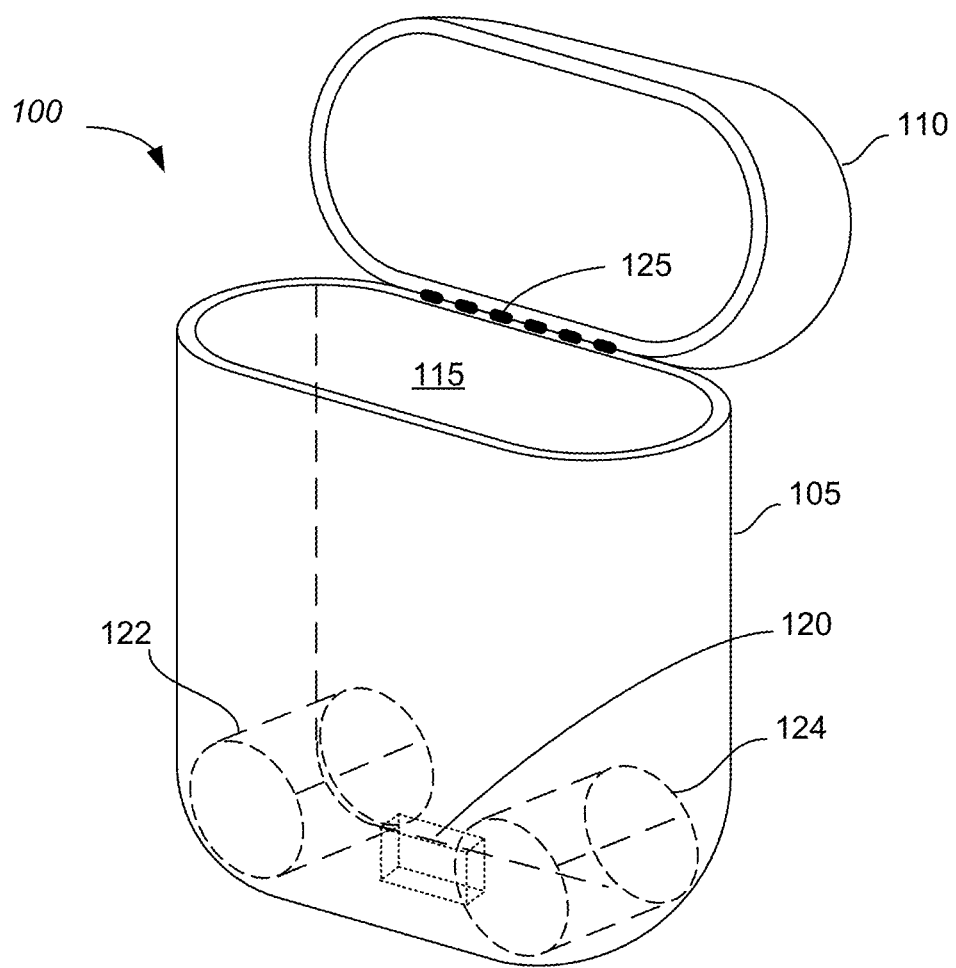
FIG. 1 illustrates a simplified perspective view of an earbud case according to some embodiments of the disclosure.

Embodiments of the disclosure pertain to portable electronic devices that can be wirelessly charged in multiple positions on a charging surface, such as an inductive charging mat or pad that provides power at different locations along the charging surface. In some embodiments the electronic device can include first and second wireless power receiving coils that can wirelessly receive power from one or more wireless power transmit coils within the charging mat. Depending on the position of the portable electronic device on the charging mat, one of the first or second coils can will likely receive power at a higher efficiency than the other. As stated above, in some embodiments, the portable electronic device being charged includes circuitry that recognizes which of the first and second wireless power receiving coils is receiving power at a lower efficiency rate and disables that receiving coil. Disabling the wireless power receiving coil receiving power at the lower efficiency can result in a higher overall charging efficiency for the portable electronic device than if both wireless receiving coils were allowed to receive power.

While embodiments of the disclosure can include many different types of electronic devices, some embodiments pertain to portable electronic devices that can be wirelessly charged including smart phones, tablet computers and other devices. Still other embodiments pertain to a case for a portable listening device, such as a pair of headphones or a pair of wireless earbuds. The case can include one or more cavities to hold the listening device and charging circuitry to provide power to a rechargeable battery within the listening device (or within each of the pair of earbuds). The case can also include first and second wireless power receiving elements and circuitry that disables either the first or second receiving element depending on which element is receiving power at the lower efficiency level. In some particular embodiments, each of the wireless power receiving elements are coils.

As used herein, the term "portable listening device" includes any portable device designed to play sound that can be heard by a user. Headphones are one type of portable listening device, portable speakers are another. The term "headphones" represents a pair of small, portable listening devices that are designed to be worn on or around a user's head. They convert an electrical signal to a corresponding sound that can be heard by the user. Headphones include traditional headphones that are worn over a user's head and include left and right listening devices connected to each other by a headband, headsets (a combination of a headphone and a microphone); and earbuds (very small headphones that are designed to be fitted directly in a user's ear). Traditional headphones include both over-ear headphones (sometimes referred to as either circumaural or full-size headphones) that have earpads that fully encompass a user's ears, and on-ear headphones (sometimes referred to as supra-aural headphones) that have earpads that press against a user's ear instead of surrounding the ear. As used herein, the term "earbuds", which can also be referred to as earphones or ear-fitting headphones, includes both small headphones that fit within a user's outer ear facing the ear canal without being inserted into the ear canal, and in-ear headphones, sometimes referred to as canalphones, that are inserted in the ear canal itself.

FIG. 1 illustrates a simplified perspective view of an earbud case 100 according to some embodiments of the disclosure. Earbud case 100 includes a housing 105 and a lid 110 that can be pivotably coupled to housing 105 by a hinge 125. Housing 105 defines an interior space in which a pair of earbuds (not shown) can be stored. In some embodiments an insert can be fit within the interior space to define one or more cavities that are sized and shaped to accept the earbuds.

Lid 110 can be moved between a closed position in which the lid covers the interior space and an open position (illustrated in FIG. 1) in which an opening 115 of the housing is exposed to allow a user to place the earbuds within or remove the earbuds from the interior space. While not shown in FIG. 1, earbud case can include a battery, charging circuitry to charge the battery and/or earbuds stored within the case, and other circuitry and components. In some embodiments, case 100 can also include a receptacle connector 120 that has an opening at an exterior surface of case 100 (e.g., the bottom surface as shown in FIG. 1). A suitable plug connector can be inserted in the opening to mate with the receptacle connector and transfer power to case 100 (e.g., from a charging cable) and/or to transfer data between case 100 and another device. Receptacle connector 120 can be, for example, a mini-USB connector, a Lightning connector developed by Apple Inc., the assignee of the present application, or any other appropriate connector.

Earbud case 100 can also include first and second wireless power receiving elements 122 and 124 that can wirelessly receive power from a wireless transmitter (e.g., a wireless transmitting coil) and provide the power to the charging circuitry. In the embodiment shown in FIG. 1, wireless power receiving elements 122, 124 are each receiver coils disposed within the interior space defined by housing 105 and can be positioned at opposite corners of the space near the bottom of case 100. Because of the physical separation between coils 122, 124, the coils may be aligned differently from each other with respect to the wireless power transmitters of a charging pad when earbud case 100 is placed on the charging pad. Thus, each wireless power receiving element will likely receive wireless power from the charging pad at different efficiency rates as described below.

Figure 2:
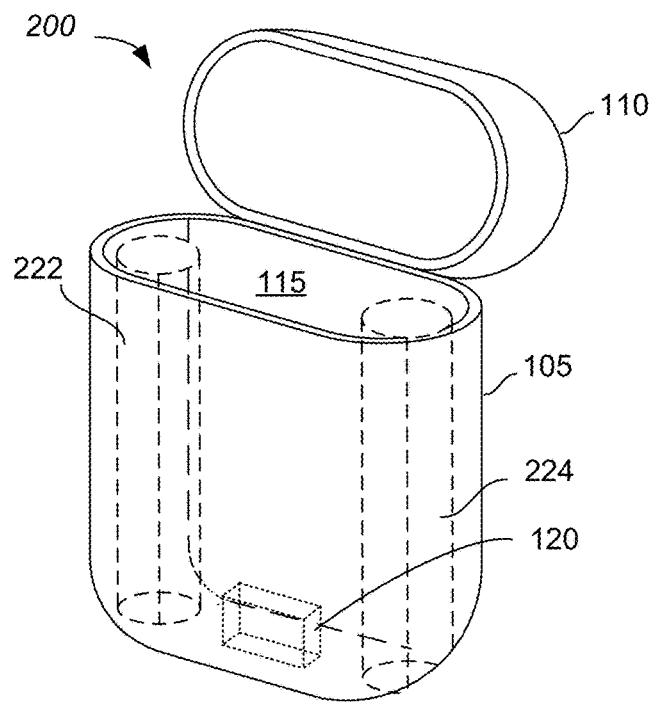
FIG. 2 illustrates a simplified perspective view of an earbud case according to some embodiments of the disclosure.

While each of the wireless receiving elements are shown in FIG. 1 as being positioned in opposing corners of the interior cavity formed by housing 105, embodiments of the disclosure are not limited to any particular placement of the receiving elements. In other embodiments, the wireless receiving elements can be located at different positions within the housing. For example, as shown in FIG. 2 an earbud case 200 includes coils 222, 224 disposed along opposing sides of the interior space defined by housing 105 such that the coils extend from a bottom surface of the space towards lid 110. In another embodiment shown in FIG. 3, an earbud case 300 includes coils 322, 324 that extend along the bottom of the interior space along the width of the case in the space between connector 120 and the front and back of housing 105, respectively, along with coils 326, 328 in lid 110. Additionally, while the various embodiments depicted in FIGS. 1-3 each include a specific number of coils, embodiments of the disclosure are not limited to any particular number of coils and some embodiments may have a single coil while other embodiments may have more than two or more than four coils.

Figure 3:
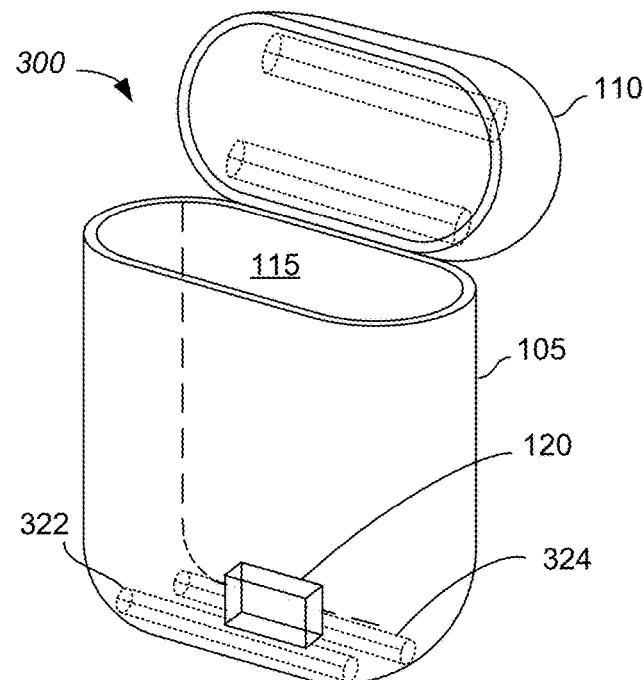
FIG. 3 illustrates a simplified perspective view of an earbud case according to some embodiments of the disclosure.
Figure 4:
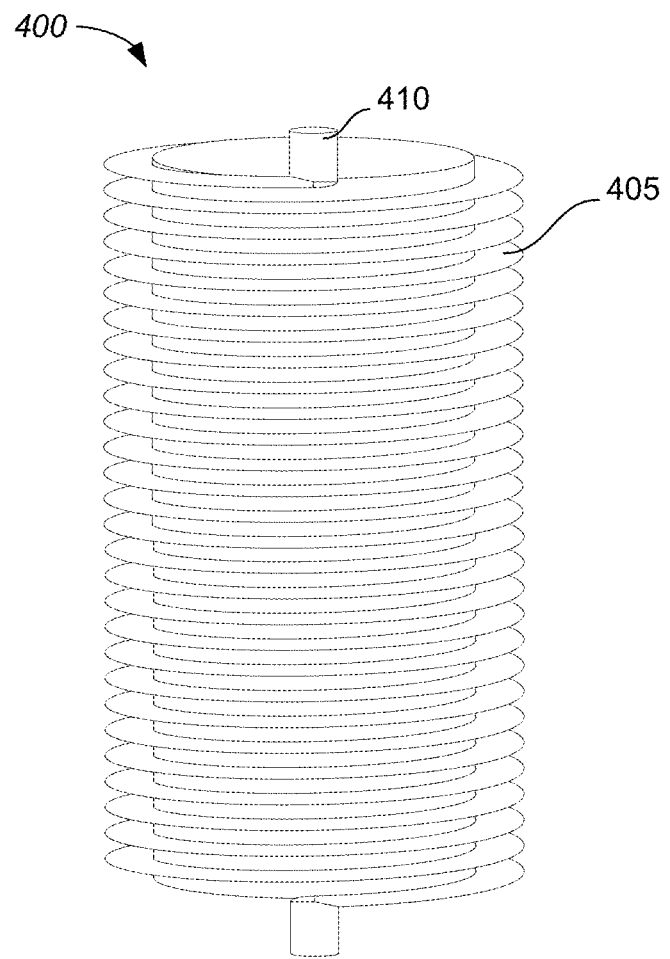
FIG. 4 illustrates an example of a solenoid coil that can be incorporated into the earbud cases shown in FIGS. 1, 2 and 3 according to some embodiments.

Referring to each of FIGS. 1-3, in some embodiments each of first and second wireless power receiving elements 122, 124 or 222, 224 or 322, 324 are three-dimensional solenoid coils. FIG. 4 is a simplified diagram of an example of a solenoid coil 400 that can be incorporated into any of earbud cases 100, 200 or 300 according to some embodiments. Solenoid coil 400 includes a coil of wire 405 wrapped around a conductive core 410.

Figure 5:
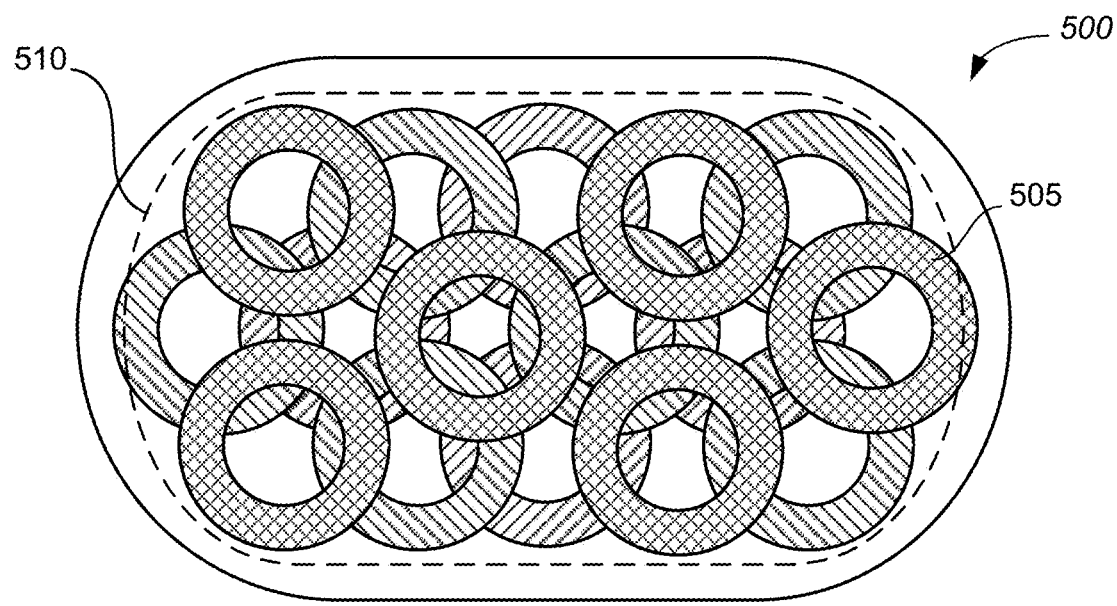
FIG. 5 illustrates an example of a charging pad that can be used to charge an earbud case according to embodiments of the disclosure.

FIG. 5 illustrates an example of a charging pad 500 that can be used to charge an earbud case according to embodiments of the disclosure. Charging pad 500 includes multiple wireless power transmitting coils 505 that are configured to wireless transmit power within a charging area 510 that closely corresponds to the size of charging pad 500. Each of the wireless power transmitting coils 505 is placed at a particular position with respect to other coils in a coil pattern to provide highly efficient charging of an accessory device, such as earbud case 100, 200 or 300, at any location within charging area 510. In this manner, charging pad 500 does not require precise alignment of any or more of the wireless power transmitting coils to a wireless power receiver of an accessory or other electronic device to be charged by pad 500. The actual efficiency of a given charging event, however, will depend on the alignment of the wireless power receiver within the accessory or other electronic device to individual ones of the wireless power transmitting coils 505 within pad 500.

Figure 6:
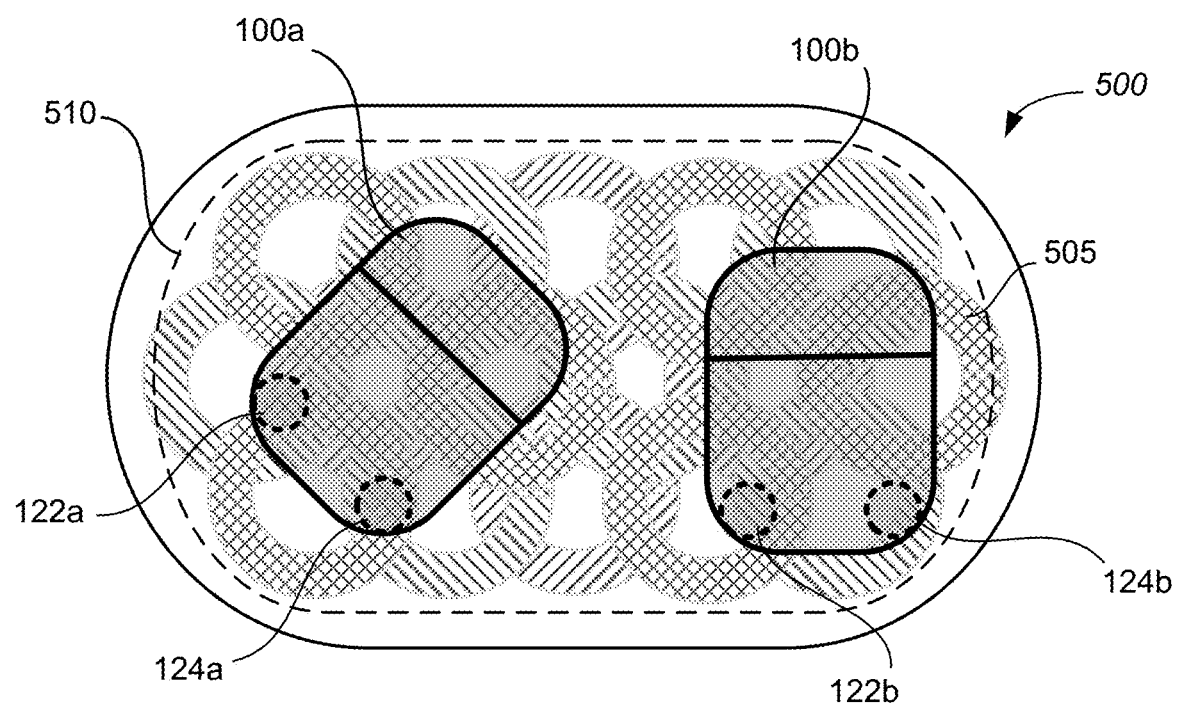
FIG. 6 illustrates two different positional placements of an earbud case according to the disclosure on the charging pad shown in FIG. 5.

FIG. 6 illustrates two different electronic devices 100a and 100b placed on charging pad 500 at different locations. Each of electronic devices 100a, 100b can be, for example, earbud charging case 100 discussed above. Electronic device 100a includes first and second wireless power receiving elements 122a, 124a while electronic device 100b includes first and second wireless power receiving elements 122b, 124b. Each of wireless power receiving elements 122a, 124a and 122b, 124b can be, for example, three-dimensional solenoid coils similar to coil 400 shown in FIG. 4.

As shown in FIG. 6, first and second wireless power receiving elements 122a, 124a of device 100a are each positioned over different portions of the wireless transmitting coil pattern. In rare instances, the placement of each receiving element 122a, 124a will be optimal with respect to the transmitting coils in charging pad 500 in which instance both the receiving elements will wirelessly receive power from the charging pad at equal efficiency rates. In all other instances, however, one of the wireless power receiving elements will wirelessly receive power from the charging pad at a higher efficiency rate than the other. The lower efficiency wireless receiving element can leak power which can result in a charging loss from that element without any overall charging benefit to the device being charged.

Embodiments of the disclosure can include switching circuitry that recognizes which of the two coils is operating at lower efficiency and automatically chooses to connect the higher efficiency coil to the charging circuitry disabling the lower efficiency coil. In some embodiments, the switching circuitry does not including any digital logic circuits and instead all the switching is handled by analog circuitry. The analog circuitry can be passive circuitry that does not have to actively choose one receiving element over another; instead, the switching can happen automatically. In some particular embodiments, the analogy switching circuitry can be a diode bridge coupled between the first and second power receiving coils and the charging circuitry that transfers power to a rechargeable battery.

As an example, based on its placement on charging pad 500 shown in FIG. 6, accessory 100a might be positioned such that wireless power receiving element 122a receives power more efficiently than element 124a. Thus, the switching circuitry within accessory 100a automatically disables wireless power receiving element 124a so that only receiving element 122a receives wireless power from the charging pad. Accessory 110b, on the other hand, might be positioned such that wireless power receiving element 124b receives power more efficiently than element 122b. Thus, the switching circuitry within accessory 100b can automatically disable wireless power receiving element 122b so that only receiving element 124b receives wireless power from the charging pad.

Figure 7:
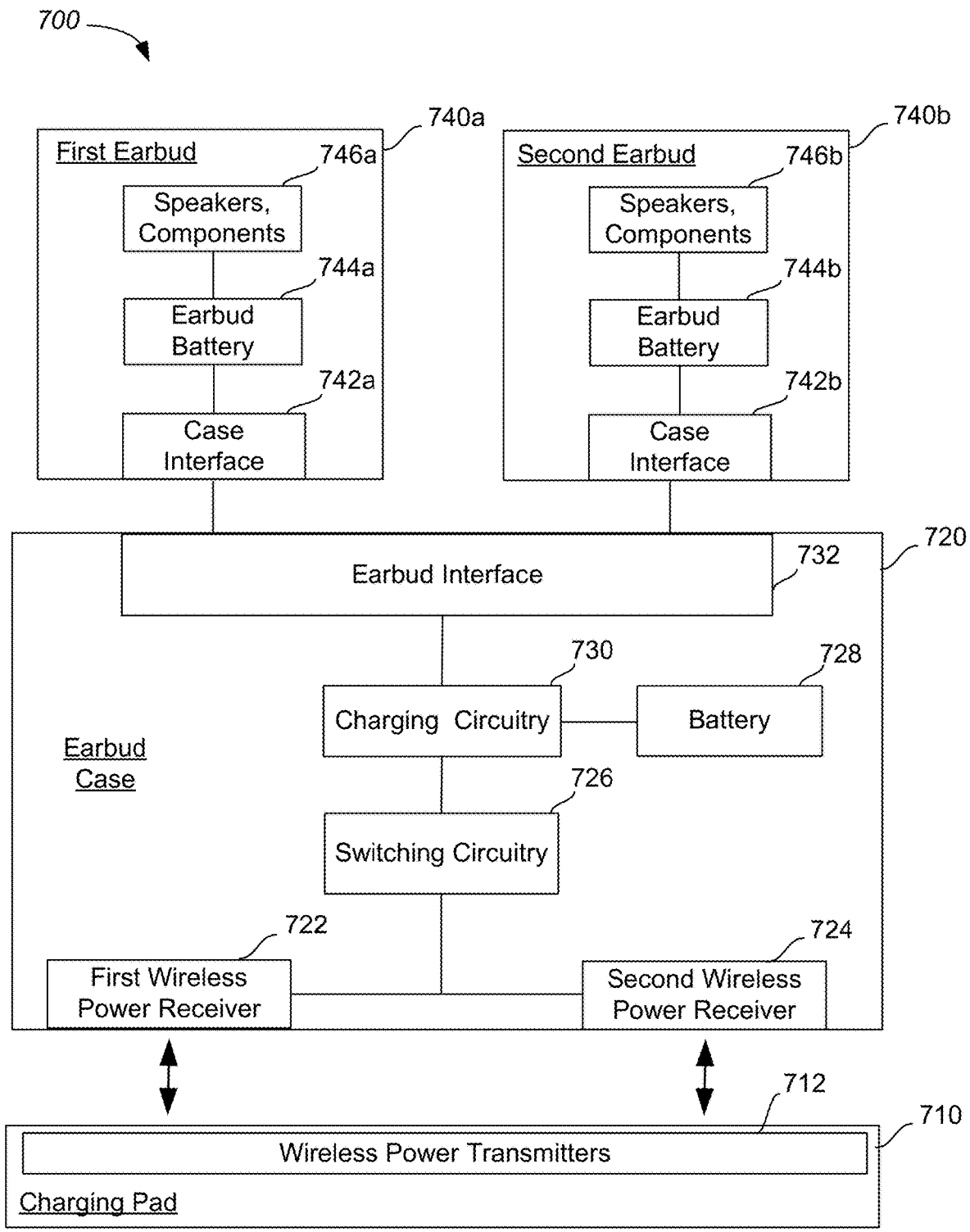
FIG. 7 is a simplified block diagram depicting various components of an earbud case according to some embodiments of the disclosure.

FIG. 7 is a simplified block diagram depicting various components of a wireless power charging system 700 according to some embodiments of the disclosure. Charging system 700 includes a wireless charging pad 710, an earbud case 720 and a pair of earbuds 740a, 740b. Wireless charging pad can be representative of wireless charging pad 500 discussed above with respect to FIG. 5, and earbud case 720 can be representative of any of earbud cases 100, 200 or 300 discussed above with respect to FIGS. 1-3.

Wireless charging pad 710 can include multiple wireless power transmitters 712 (e.g., multiple power transmitting coils 505) disposed beneath the surface of the charging area. The multiple wireless power transmitters enable charging pad 710 to simultaneously wireless charge more electronic devices and enable the devices being charged to be randomly placed within a charging area of the charging pad 710 defined by the placement of the wireless power transmitters.

Earbud case 720 includes first and second wireless power receiving elements 722, 724 (e.g., coils 122, 124), switching circuitry 726, a battery 728, charging circuitry 730, and an earbud interface 732. Battery 728 can be a rechargeable battery that provides power for circuitry associated with earbud case 720. Wireless power receiving elements 722, 724 can wirelessly receive power from the wireless power transmitters 712 within charging pad 710. The received power can be provided to charging circuitry 730 to charge rechargeable battery 728. Charging circuitry can take the voltage received from receiving elements 722, 724 and step the voltage down or up as appropriate to a voltage level that is best suited for charging battery 728.

When the earbuds are properly positioned and stored within case 720, battery 728 can also be used to charge one or both of earbud rechargeable batteries 744a, 744b within the respective earbuds 740a, 740b through a connection between earbud interface 732 within the earbud case and the case interfaces 742a, 742b within each earbud. In this manner, battery 728 enables the earbuds to be charged even though case 720 is not electrically coupled to power source 710 or to another power source. Thus, case 720 can be used to charge pair of earbuds 740a, 740b while the case is, for example, in a user's pocket as long as case battery 728 has sufficient charge. Each earbud 740a, 740b also includes a speaker and other components 746a, 746b that enable the earbuds to generate sound.

Additionally, earbud case 720 can recharge batteries 744a, 744b within each of earbuds 740a, 740b when the earbuds are properly stored in case 720 from power stored within battery 728 even when the case is not receiving power from charging pad 710.

According to some embodiments, switching circuitry 726 is coupled between the wireless power receiving elements 722, 724 and charging circuitry 730. In some embodiments wireless power receiving elements 722, 724 can be connected in parallel with each other while in other embodiments the wireless power receiving elements can be connected in series. When connected in parallel and the power receiving elements are in the same phase, switching circuitry 726 can selectively deactivate one of the power receiving elements to improve charging efficiency. For example, in instances where the placement of earbud case 720 on charging pad 710 results in each receiving element 722, 724 being at an optimal position with respect to the transmitting coils in charging pad 710, power from both wireless power receivers 722, 724 can pass through switching circuitry 726 to charging circuitry 730. In other instances, where one of the wireless power receiving elements is receiving power at a higher efficiency rate than the other, switching circuitry 726 can disable the lower efficiency element by disconnecting it from the charging circuitry. In some embodiments, switching circuitry 726 can be passive analog circuitry (e.g., a diode bridge) that enables the switching to happen automatically. Thus, if earbud case 720 is moved to a different position on charging pad 710 in the middle of a charging event such that the deactivated wireless power receiver suddenly becomes the higher efficiency receiver, switching circuitry 726 automatically switches the newly higher efficiency receiver to charging circuitry 730 and deactivates the other wireless power receiver that was previously providing power to the charging circuitry when the earbud case was in the former position. In other embodiments, switching circuitry 726 can be active circuitry.

In some embodiments, wireless power receiving elements 722, 724 can be connected in series such that current is driven through both elements in the same direction. Rather than disconnect one of the power receiving elements in such embodiments, switching circuitry 726 can invert the phase of one receiving elements 722, 724. Thus, for example, instead of switching the element at the lower efficiency level off during charging, switching circuitry 726 can invert the phase of one of the elements by 180 degrees driving current up one of coils 722, 724 and driving current down the other coil enabling both coils to be operable during a charging event to further improve charging efficiency.

In some embodiments, wireless charging mat 710 can be an "intelligent mat" that can determine the phase of each individual coil of wireless power transmitters 712 in response to communication between the device. Charging mat 710 can detect, based on charging efficiency, what phase is optimal to charge a given device and set the phase of individual coils appropriately. When two devices share the same coil, however, the ideal phase for the first device may be different than the ideal phase for the second device.

In some embodiments of the present disclosure, switching circuitry 726 can independently rectify each receiving element 722, 724 enabling the receiving elements to go to DC separate from each other. Such embodiments can be particularly beneficial when multiple devices are simultaneously being charged by an intelligent charging mat. For example, referring back to FIG. 5, if a second device (e.g., an inductively chargeable smart watch) is placed on mat 500 at a position proximate to a position that earbud case 100a is positioned such that the two devices may try to share charge from the same coil within mat 500. The charging mat cannot necessarily chose a phase for that coil that would be ideally suited to charge both devices. Independently rectifying the receiving elements 722, 724 in both devices in such an instance allows the earbud case to select the relative phases of each wireless receiving element thus enabling the devices to be optimally charged. Independent rectification is also an advantage is one of the receiving elements is hanging off the edge of charging mat.

Figure 8C:
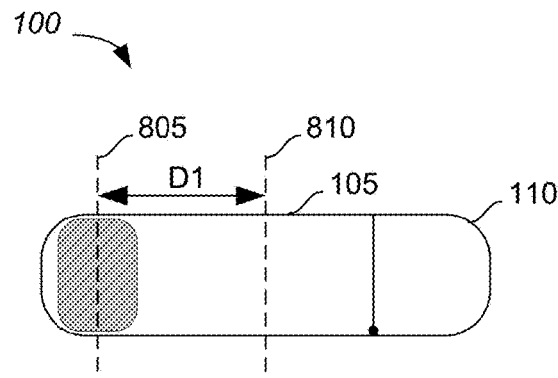
FIG. 8C illustrates different positional placements of earbud cases according to the present disclosure on charging pad 500 shown in FIG. 5.
Figure 8C:
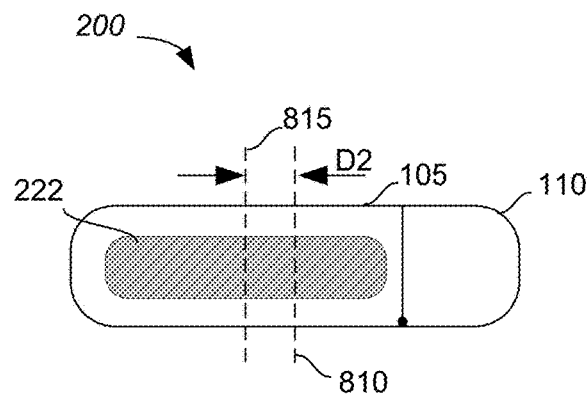
Figure 8C:
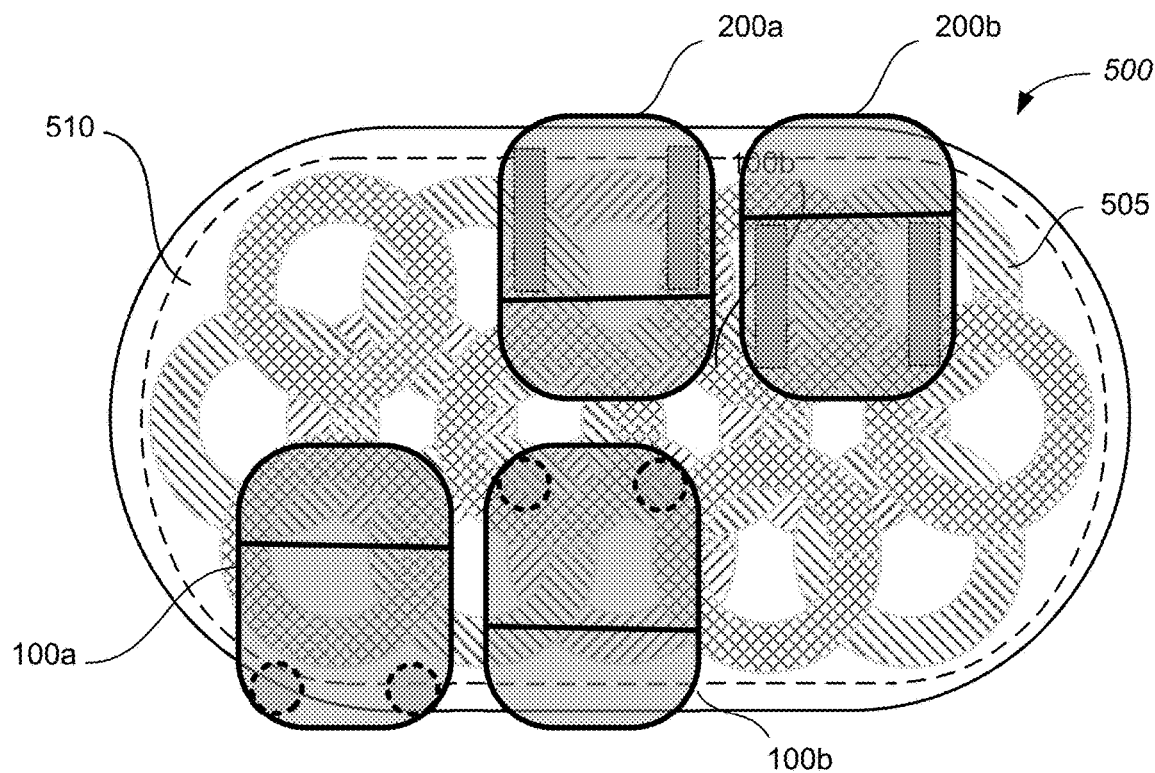

Referring back to FIG. 1, the wireless power receiving coils 122, 124 are positioned near the bottom of case 100. Thus, the center of each power receiving coil (represented by dashed line 805) is spaced apart a distance D1 from the center of the case (represented by dashed line 810) as shown in FIG. 8A, which is a simplified side view of case 100. Because of the placement of the power receiving coils relative to the center of the case, if case 100 is positioned on charging mat 500 near an outer edge of the mat, the charging efficiency may depend on the orientation at which the case is positioned on the mat. For example, as shown in FIG. 8C, if an earbud case 100a is positioned near an outer edge of charging mat 500 such that the wireless power receiving coils are positioned near the outer edge of the mat, the coils may not be directly over one or more of the wireless power transmitting coils 505 resulting in a decreased charging efficiency. If, on the other hand, an earbud case 100b is positioned near the same outer edge of mat 500 but in a reversed orientation, the power receiving coils are more likely to be positioned directly over one or more of the wireless power transmitting coils 505 enabling an efficient charge. The user may not be aware that the orientation of the case relative to an edge of the mat has an impact on charging efficiency in this manner. Similar charging efficiency issues may exist with the placement of the wireless power receiving coils 322, 326 or 324, 328 in case 300.

Some embodiments of the disclosure address this issue by ensuring that the center of the wireless power receiving coils is at or very close to the center of the case. For example, as shown in FIG. 8B, which is a simplified side view of case 200, the center of each power receiving coil 222, 224 (represented by dashed line 815) is spaced apart a distance D2 from the center of the case where D2 is considerably smaller than D1. As shown in FIG. 8C, earbud cases 200a and 200b can each be positioned near an outer edge of charging mat 500 in opposite orientations while still ensuring that the wireless power receiving coils of each case are generally positioned over one or more of the wireless power transmitting coils 505 resulting in relatively efficient wireless charging of earbud cases 200a and 200b by mat 500.

Additionally, instead of using solenoid coils as the wireless power receiving elements, some embodiments of the disclosure can include one or more generally flat coils formed along a back and/or front wall of an earbud case or other electronic device. For example, FIG. 9A is a simplified perspective view of an earbud case 900 according to some embodiments of the disclosure. Case 900 includes many of the same features as cases 100, 200 and 300 and thus uses many of the same reference numbers. Instead of having a pair of solenoid coils as wireless power receiving elements 122, 124, however, case 900 has a single pancake-like coil 902 formed along a back wall of case 900 the same wall in which a hinge is attached to couple housing 105 to lid 110. Similar to cases 200a, 200b, case 900 can be positioned with near an outer edge of a charging mat 500 with its back surface against the mat in any orientation and still wirelessly receive an efficient charge In other embodiments, an earbud case according to the present disclosure can include a first coil on a back surface of the case as shown in FIG. 9A and a second coil, similar to the first coil, formed along a front wall of the case. Such an embodiment enables the case to be charged with either the front or the back surface placed down on a charging mat. Still other embodiments can include a coil that encircles the case along an inner periphery of housing 105, which also enables charging from either the front or back surface, such as coil 922 shown in FIG. 9C.

Coil 902 can be a stranded coil, a coil formed on a flex circuit or another type of coil and can be completely flat or can formed into a curved shape to match the curvature of case 900 (e.g., coil 902 can curve inward near each of the sides of the case 900). Since the coil is formed closer to the center of case 900, as shown in FIG. 9B, a center 915 of coil 902 is closely spaced by distance D3 to the center 810 of case 900. Thus, the charging efficiency of cases 200 and 900 generally does not depend much on the orientation of cases when the cases are placed near an edge of the charging mat.

Figure 10:
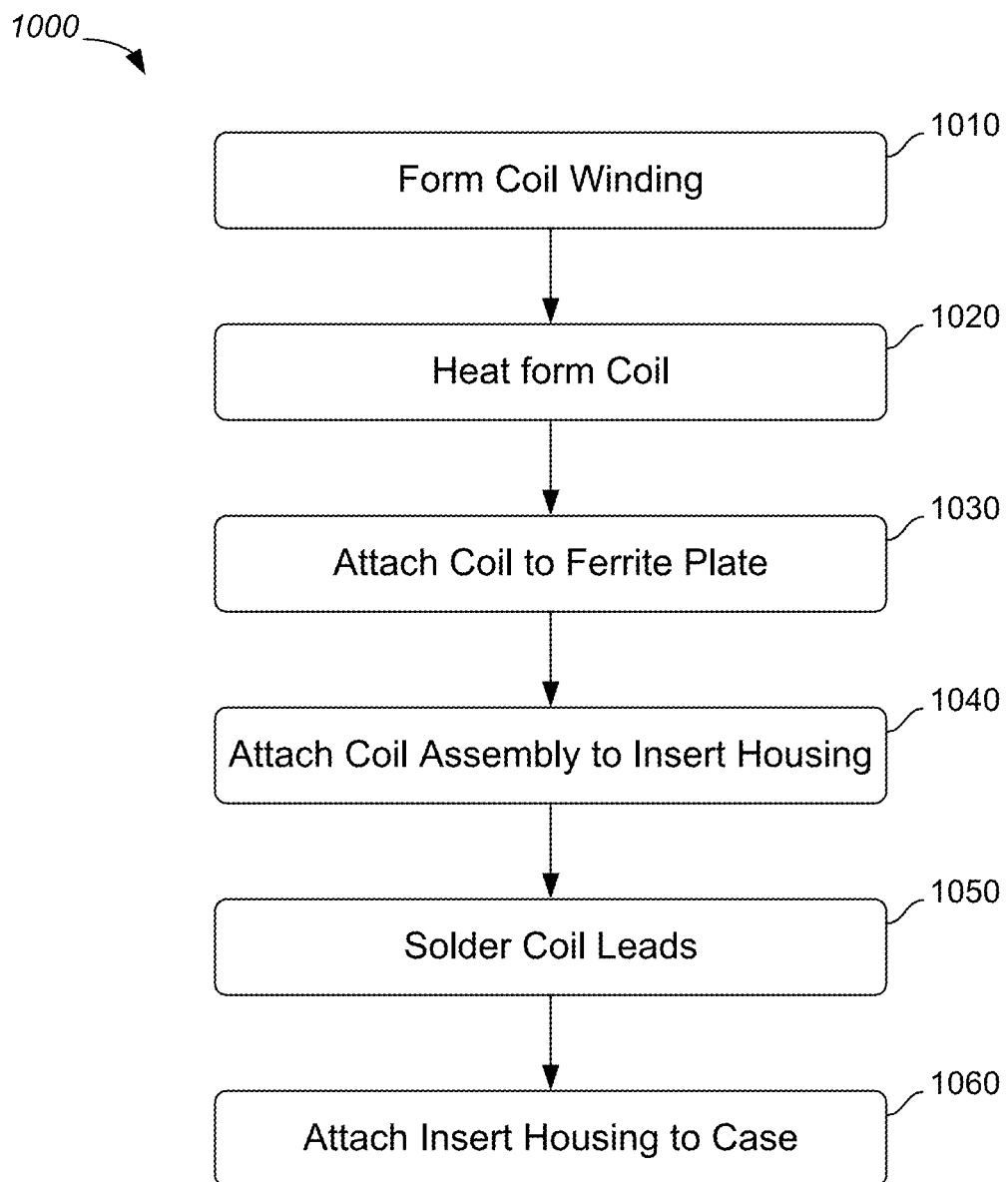
FIG. 10 is a flowchart depicting steps associated with forming a wireless power receiving coil according to some embodiments of the disclosure.
Figure 11:
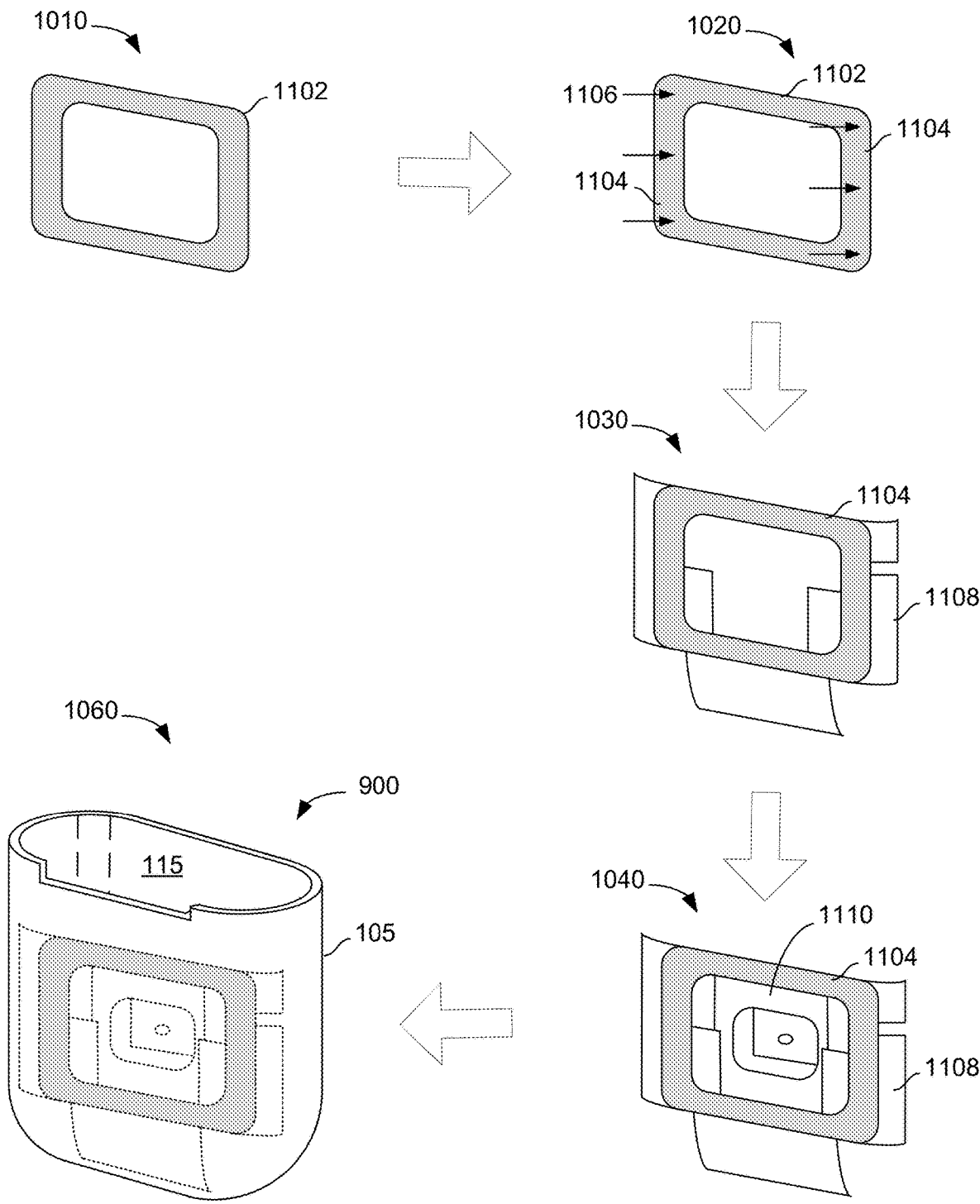
FIG. 11 depicts the coil formed by the method of FIG. 10 at various stages of the formation process.

In some embodiments coil 902 is part of a coil module that can be formed according to the method shown in FIGS. 10 and 11 and inserted into case 900. To illustrate such, reference is made to both FIGS. 10 and 11 where FIG. 10 is a flowchart depicting steps associated with forming coil 902 and FIG. 11 depicts the coil at various the stages of formation set forth in FIG. 10. As shown in FIG. 10, an initial step in the formation of the coil module is forming a coil winding 1102 (step 1010) from a stranded wire although in other embodiments the coil can be formed with conductive traces formed on a flex. In embodiments where the size of the coil is maximized and the earbud case includes one or more curved surfaces, coil winding 1102 can be heat formed to match the curvature of the earbud case to form a curved coil winding (step 1020). In the embodiment depicted in FIG. 11, the coil winding is bent along arrows 1106 such that the coil is curved at its two opposing ends 1104 to match the curvature of the sides of an earbud case 900.

Next, the curved coil winding can be attached to a ferrite plate 1108 with an adhesive or other appropriate technique (step 1030). In the final assembly when the receiver coil is attached to the earbud case, ferrite plate 1108 is positioned between coil 1102 and the control circuitry (e.g., a microcontroller or similar processor and/or one or more other integrated circuits such as a wireless communication controller, an ASIC, etc.) of the earbud case. In this manner ferrite plate 1108 both shields the sensitive internal components in the earbud case from magnetic flux generated by the wireless charging device that provides wireless power to receiver coil 1102 while allowing the receiver coil to be exposed to the magnetic flux to before being blocked by the ferrite plate. In some embodiments ferrite plate 1108 includes two separate ferrite layers. For example, in one particular embodiment ferrite plate 1108 includes a first ferrite layer sandwiched between two thin polyethylene terephthalate (PET) layers and a second ferrite layer formed over a thin PET layer and attached to the first ferrite layer stack by a thin pressure sensitive adhesive (PSA) layer. In some embodiments ferrite plate 1108 is less than 500 microns thick. In one particular example, the first ferrite layer is 80 microns thick, each PET layer and the PSA layer is 10 microns thick and the second ferrite layer is 120 microns thick such that ferrite plate 1108 has a total thickness of about 240 microns.

The coil/ferrite subassembly can then be attached to an insert housing 1110 (step 1040) using a UV glue or other type of adhesive. In some embodiments case 900 includes a user input button centered on the back of housing 105 below the hinge. Insert housing 1110 can house components associated with the input button and is thus sometimes referred to herein as button housing 1110. Prior to attaching button housing 1110 to housing 105, the leads of coil 1104 can be soldered to contacts on the housing (step 1050, not shown in FIG. 11) so that electrical components within housing 105 (e.g., charging circuit 730, battery 728) can be electrically coupled to the coil. Then, button housing 1110 can be inserted into and attached to earbud housing 105 for the earbud case 900 (step 1060).

Figure 12:
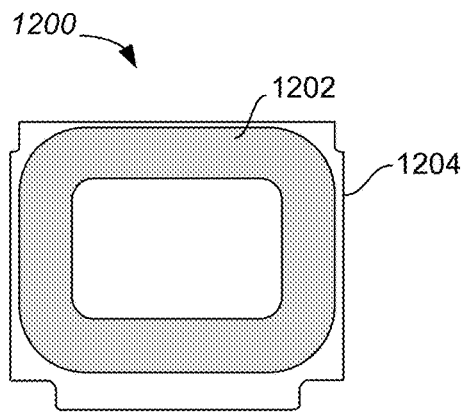
FIG. 12 is top plan view of a coil module according to some embodiments of the disclosure.
Figure 13:
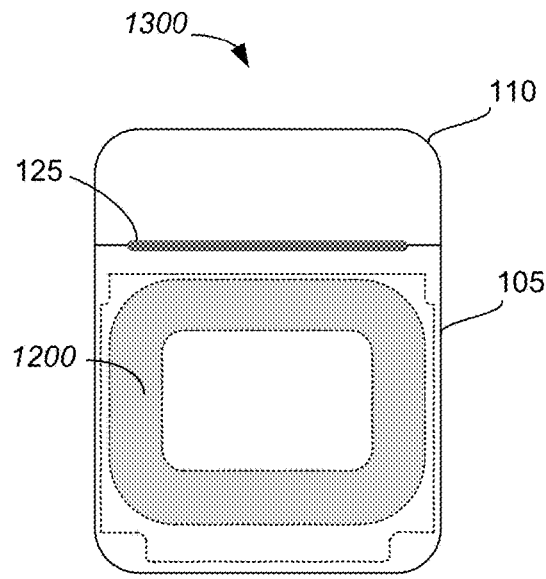
FIG. 13 depicts a simplified rear plan view of an earbud case that includes the coil module shown in FIG. 12.

Reference is now made to FIG. 12, which is top plan view of a coil module 1200 having a coil 1202 attached to a ferrite plate 1204. As shown in FIG. 12, ferrite plate 1204 generally covers the entirety of coil 1202 to provide protect components within the earbud case from magnetic flux as described above. FIG. 13 illustrates a simplified rear plan view of an earbud case 1300 that includes coil module 1200 within housing 105 at a location adjacent to a back surface of the housing.

In some embodiments an electronic device that includes a receiver coil according to the present disclosure may also include one or more magnets that can assist in the operation of the device. For example, in some embodiments an earbud case according to the present disclosure can include a lid 110 having an over-center configuration where the lid is in a first stable position when in a closed position and is in a second stable position when in a fully open position, but is generally in an unstable position in-between the closed position and the open position. Such a configuration can be referred to as a bi-stable configuration where, when the lid is between the open and closed positions, it tends to be attracted to either the closed or the open position. In some embodiments the bi-stable operation of the lid can be enabled by magnets in the lid and in the case. In the bi-stable configuration the magnets combine to secure the lid in the closed position and to resist the lid moving from the open to the closed position.

Figure 15:
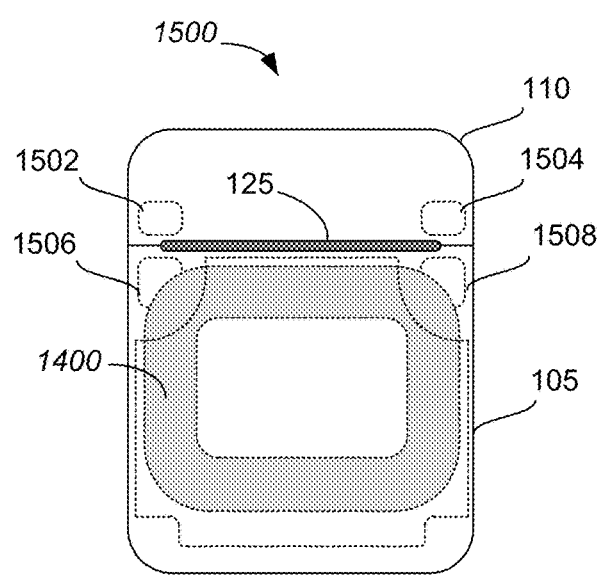
FIG. 15 depicts a simplified rear plan view of an earbud case that includes the coil module shown in FIG. 14.

FIG. 15 illustrates a simplified rear plan view of an earbud case 1500 that includes a lid 110 having such a bi-stable operation. As shown in FIG. 15, earbud case 1500 includes a first pair of magnets 1502, 1504 in lid 110 and a second pair of magnets 1506, 1508 attached to housing 105 at a location adjacent to a back surface of the housing. Magnets 1506, 1508 are spaced apart from magnets 1502, 1504 and be aligned to generate repulsive forces that tend to move lid 110 to the open position when the lid is in the closed position, and when the lid is in the open position, generate attraction forces that tend to keep the lid in the open position. Additional magnets (not shown) positioned at the front surface of the lid and housing of earbud case 1500 generate attractive forces that over power the repulsive forces of magnets 1502, 1504 and 1506, 1508 when the lid is closed or close to a closed position.

Figure 14:
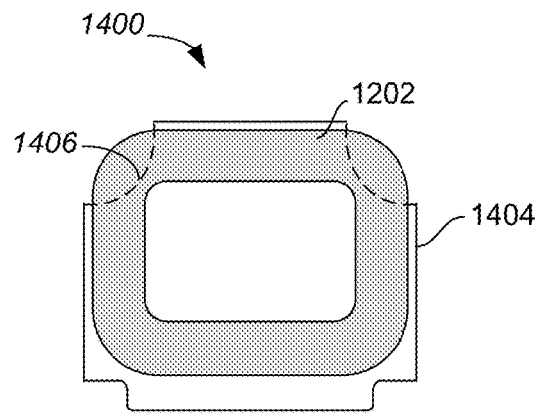
FIG. 14 is top plan view of another coil module according to some embodiments of the disclosure.

The inventors discovered that the presence of magnets 1506, 1508 can have an adverse impact on the flux generated within earbud case 1500 during a charging event. Specifically, the magnets that repel each other can push flux away from the magnets creating a leaky flux situation. The ferrite plate is relatively permeable and pulls the flux towards it saturating the ferrite. To address this issue, some embodiments of the disclosure create a cutout region 1406 (see FIG. 14) at each of the two corners of a ferrite plate 1404 (that is otherwise similar to ferrite plate 1204) that are located near magnets 1506, 1508. The cutout regions 1406 are located directly behind a portion of coil 1202 creating an air barrier (low permeability) between the repulsion magnets 1506, 1508 and portions of coil 1202 where the ferrite plate would otherwise have been. The inventors have found that removing cutout regions 1406 of ferrite plate 1404 makes the ferrite plate more effective than a plate that fully covers coil 1202. The inventors have found that, counter intuitively, such a configuration improves flux uniformity and hence improves charging.

While the various embodiments and examples described above were primarily focused on an earbud case for storing earbuds, embodiments of the disclosure are not limited to such and the techniques of the disclosure described above are equally applicable to other portable electronic devices including wearable devices, smart phones, and tablet computers among others. Also, other embodiments of the disclosure are applicable to cases for other types of headphones. For example, in one embodiment, case 100 described in FIG. 1 can be a case for a pair of headphones instead of a pair of earbuds. In an earbud embodiment, two separate cavities can formed within housing 105 where one cavity is sized and shaped to hold a left earbud and the other cavity is sized and shaped to hold a right earbud. Similarly, in other embodiments, case 100 can be sized and shaped to hold a portable speaker or other type of listening device.

What is claimed is:

1. A case for a pair of earbuds, the case comprising:
   a housing having first and second cavities formed within the housing, the first cavity sized and shaped to hold a left earbud in the pair of earbuds and the second cavity sized and shaped to hold a right earbud in the pair of earbuds;
   a lid attached to the housing and operable between a closed position in which the lid is aligned over the first and second cavities and an open position in which the first and second cavities are exposed enabling the pair of earbuds to be removed from or placed within the case;
a receptacle connector having an opening at an exterior surface of the housing and a plurality of contacts positioned within the opening;
a rechargeable battery disposed within the housing;
one or more wireless power receiving elements disposed within the housing and configured to receive power from a wireless power transmitter during a charging event in which the case is positioned proximate to the wireless power transmitter; and
charging circuitry operatively coupled to receive power from the one or more wireless power receiving elements and transfer the received power to the rechargeable battery.

2. The case for a pair of earbuds set forth in claim 1 further comprising a processor disposed within the housing.

3. The case for a pair of earbuds set forth in claim 2 wherein the receptacle connector opening is positioned at a bottom surface of the case and the receptacle connector opening is centered between the first and second cavities within the housing.

4. The case for a pair of earbuds set forth in claim 2 wherein the one or more wireless power receiving elements comprises a pair of wireless power receiving coils each of which is disposed adjacent to the bottom surface.

5. The case for a pair of earbuds set forth in claim 4 wherein each of the wireless power receiving coils in the pair of wireless power receiving coils comprises a solenoid coil.

6. The case for a pair of earbuds set forth in claim 2 wherein the one or more wireless power receiving elements comprise a wireless power receiving coil.

7. The case for a pair of earbuds set forth in claim 6 wherein the wireless power receiving coil comprises a stranded coil.

8. The case for a pair of earbuds set forth in claim 6 wherein the wireless power receiving coil comprises a pancake-like coil.

9. The case for a pair of earbuds set forth in claim 1 wherein the lid is coupled to the housing by a hinge and the case comprises a plurality of magnetic elements disposed within the housing and the lid, the plurality of magnetic elements configured to secure the lid in the closed position and to resist the lid moving from the open to the closed position.

10. The case for a pair of earbuds set forth in claim 1 wherein the receptacle connector comprises a mini-USB connector that can transfer power to the case.

11. The case for a pair of earbuds set forth in claim 1 further comprising an earbud interface that provides a connection to the left and right earbuds when the earbuds are positioned within their respective cavities.

12. The case for a pair of earbuds set forth in claim 1 further comprising control circuitry including a microcontroller and a wireless communication controller.

13. The case for a pair of earbuds set forth in claim 12 further comprising a ferrite plate disposed between the one or more wireless power receiving elements and the processor.

14. The case for a pair of earbuds set forth in claim 13 wherein the ferrite plate comprises a polyethylene terephthalate layer sandwiched between first and second ferrite layers.

15. The case for a pair of earbuds set forth in claim 13 wherein the ferrite plate comprises multiple layers and is less than 500 microns thick.

16. The case for a pair of earbuds set forth in claim 15 wherein the one or more wireless power receiving elements comprises a coil coupled to the ferrite plate.

17. A case for a pair of earbuds, the case comprising:
a housing having first and second opposing major surfaces, first and second opposing sidewalls extending between the first and second major surfaces, a bottom surface extending between the first and second major surfaces and between the first and second sidewalls, and first and second cavities formed within the housing, the first cavity configured to receive a first earbud in the pair of earbuds and the second cavity configured to receive a second earbud in the pair of earbuds;
a lid attached to the second major surface of the housing and operable between a closed position where the lid is aligned over the first and second cavities and an open position where the first and second cavities are exposed enabling the pair of earbuds to be removed from or placed within the case;
a rechargeable battery disposed within the housing;
one or more wireless power receiving elements disposed within the housing and configured to receive electric charge from a wireless power transmitter during a charging event in which the case is positioned proximate to the wireless power transmitter;
charging circuitry operatively coupled to receive power from the one or more wireless power receiving elements and transfer the received power to the rechargeable battery.

18. The case for a pair of earbuds set forth in claim 17 wherein the one or more wireless power receiving elements comprise a first wireless power receiving coil and a second wireless power receiving coil.

19. The case for a pair of earbuds set forth in claim 17 further comprising a receptacle connector having an opening at an exterior surface of the housing and a plurality of contacts positioned within the opening.

20. The case for a pair of earbuds set forth in claim 17 further comprising a microcontroller and a wireless communication controller disposed within the housing.

* * * * *